United States Patent [19]

Taig

[11] 4,316,519
[45] Feb. 23, 1982

[54] SELF-ENERGIZED POWER STEERING UNIT

[75] Inventor: Alistair G. Taig, South Bend, Ind.

[73] Assignee: The Bendix Corporation, Southfield, Mich.

[21] Appl. No.: 93,326

[22] Filed: Nov. 13, 1979

[51] Int. Cl.³ .............................................. B62D 5/06
[52] U.S. Cl. ..................................... 180/148; 60/413; 91/5; 180/155
[58] Field of Search ............... 180/132, 148, 160, 159, 180/155, 154; 280/773; 60/413, 415; 91/5

[56] References Cited

U.S. PATENT DOCUMENTS

| | | | |
|---|---|---|---|
| 684,953 | 10/1901 | Singer | 180/165 |
| 1,621,916 | 3/1927 | Williams et al. | 280/773 |
| 3,507,580 | 4/1970 | Howard et al. | 180/165 X |
| 3,921,746 | 11/1975 | Lewus | 180/165 |

Primary Examiner—John A. Pekar
Attorney, Agent, or Firm—Paul David Schoenle; Ken C. Decker

[57] ABSTRACT

A self-energized, self-contained power steering unit is provided. The power steering unit requires no external power source for the pressurized fluid supplied therein to assist the steering. Instead, the unit has a pump which supplies fluid under pressure, with the pump being operated by the motion of the vehicle on which the power steering unit is used. Preferably, two pumps are employed at ends of the power steering unit and are operated by the motion of the tie rods of the vehicle. The unit requires no external passages but contains an accumulator and a reservoir connected to two annular cylinders by internal passages and an internal spool valve controlled by the steering mechanism.

35 Claims, 8 Drawing Figures

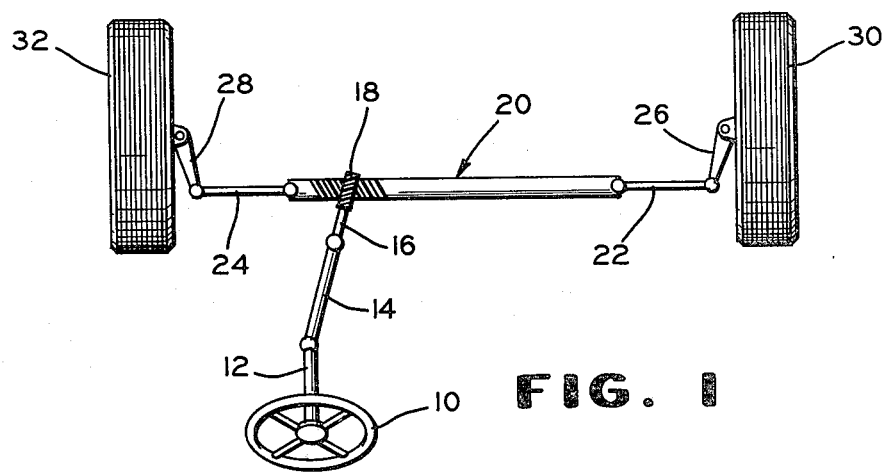
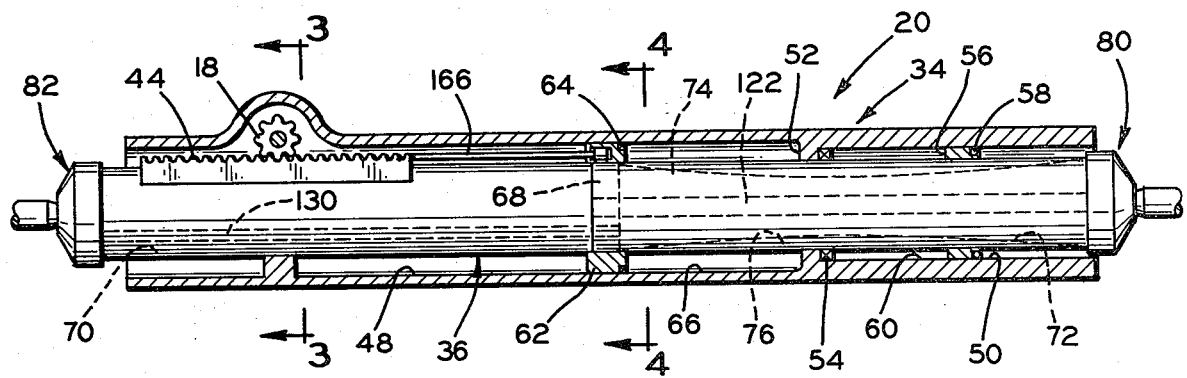
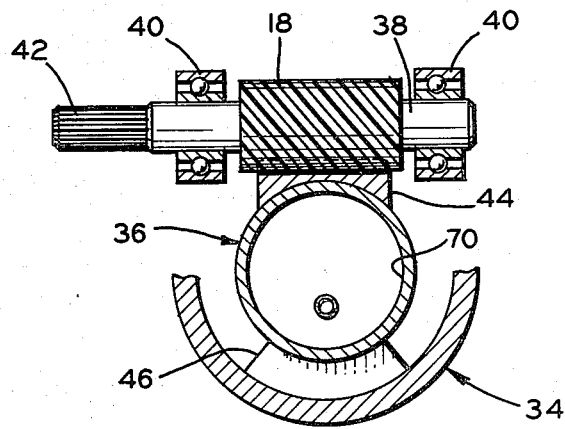
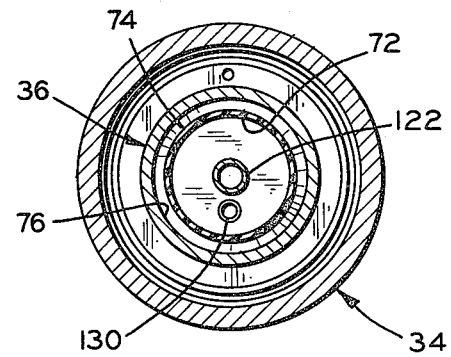
FIG. 1
FIG. 2
FIG. 3
FIG. 4

SELF-ENERGIZED POWER STEERING UNIT

This invention relates to a self-energized, self-contained power steering unit in which pressurized fluid is supplied through the motion of the vehicle in which the unit is mounted.

Heretofore, power steering units have been supplied with pressurized fluid from external pumps driven by the vehicle engines which, of course, consumes additional power or energy. Also, these units required external fluid passages which were subjected to leaking and damage and the external pumps and additional passages added to the weight of the vehicles.

The invention provides a power steering unit with fluid pumps which are operated by the motion of the vehicle and specifically by the movement of the tie rods. The pumps, valves, and passages are all contained within the unit, with no external components being required.

More specifically, the self-energized, self-contained power steering unit embodying the invention includes an elongate housing in which an elongate tubular sleeve is held for longitudinal movement. The housing has an annular wall therein which extends inwardly into sealing engagement with the tubular sleeve. A first annular piston is affixed to the tubular sleeve on one side of the annular wall with a first annular cylinder being formed therebetween. A second annular piston is affixed to the tubular sleeve on the other side of the annular wall and forms a second annular cylinder, with the second piston being larger in area than the first piston.

The tubular sleeve has a centrally located dividing wall, with a hydraulic accumulator being formed in one end portion of the tubular sleeve on one side of the wall and a fluid reservoir being formed in the other end portion of the sleeve on the other side of the wall. An internal passage connects the accumulator with the first cylinder, with the cylinder being selectively connected to the accumulator or the reservoir through additional internal passage means and a valve. A gear rack is slidably mounted within the housing on the tubular sleeve and is connected to the valve for controlling same when the gear rack is moved by a pinion turned by a steering wheel of the vehicle.

In accordance with the invention, a fluid pump is mounted on at least one end of the tubular sleeve and preferably pumps are located at both ends. The pumps are connected to tie rods of the steering system and are operated by the motion of the tie rods to supply fluid under higher pressure to the accumulator from the reservoir. Since the tie rods operate under natural motion of the vehicle, no external or additional power or energy is required to supply the pressurized fluid to the power steering unit.

It is, therefore, a principal object of the invention to provide a power steering unit requiring no external energy source.

Another object of the invention is to provide a power steering unit which is self-contained, requiring no external pump or passages.

A further object of the invention is to provide a power steering unit which is more compact and lighter in weight than conventional power steering systems.

Yet another object of the invention is to provide a power steering unit having at least one pump at an end portion thereof which is connected to and operated by a tie rod.

Many other objects and advantages of the invention will be apparent from the following detailed description of a preferred embodiment thereof, reference being made to the accompanying drawings, in which:

FIG. 1 is a schematic plan view of a steering system of an automotive vehicle;

FIG. 2 is an enlarged schematic view in longitudinal cross section of a power steering unit of the system of FIG. 1;

FIG. 3 is a further enlarged, somewhat schematic, fragmentary view in transverse cross section taken along the line 3—3 of FIG. 2;

FIG. 4 is a somewhat schematic view in transverse cross section taken along the line 4—4 of FIG. 2;

Figure 5:
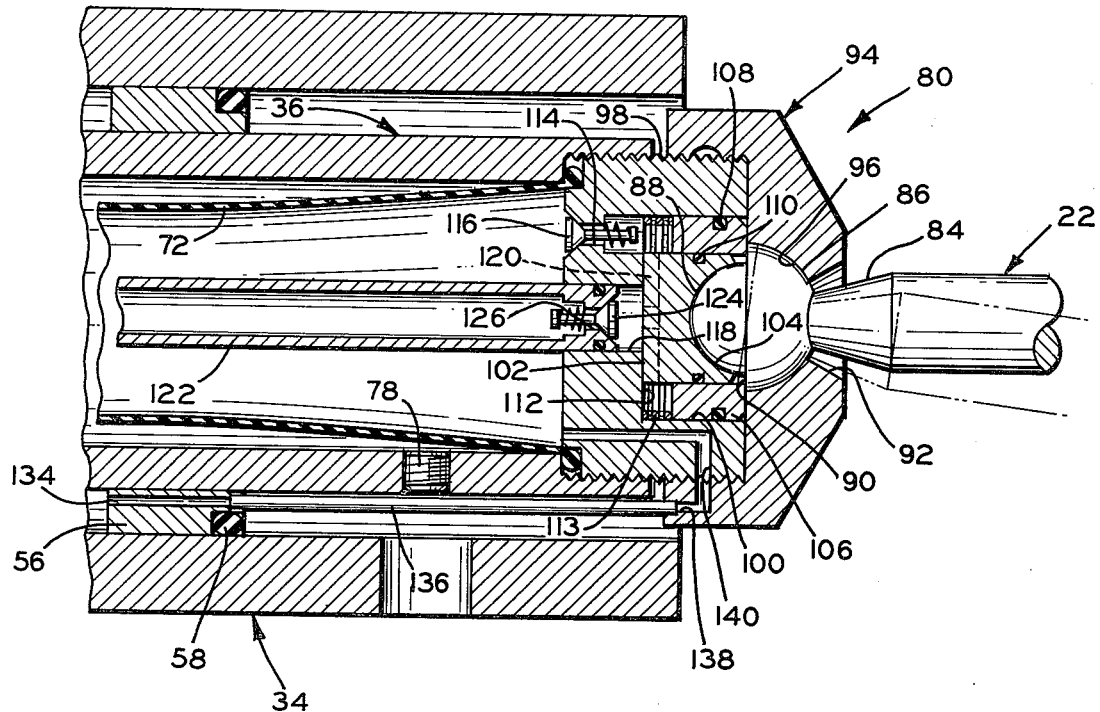
FIG. 5 is a somewhat schematic, further enlarged fragmentary view in longitudinal cross section of a right end portion of the power steering unit of FIG. 2.

Referring to FIG. 1, the steering assembly of an automotive vehicle is shown schematically. It includes a steering wheel 10, a steering column 12, a connecting shaft 14, a stub shaft 16, and a pinion gear 18. A power steering unit 20 in accordance with the invention extends transversely of the vehicle and is pivotally connected to a tie rod 22 at the right end and a tie rod 24 at the left end. The tie rods are pivotally connected to arms 26 and 28 of wheels 30 and 32 and move up and down with the arms and the wheels when the vehicle is in motion. The power steering unit 20 includes an elongate housing 34 (FIG. 2) in which is held an elongate tubular sleeve or member 36 movable longitudinally therein. When the sleeve 36 moves toward the right, the vehicle turns toward the left and when the sleeve moves toward the left, the vehicle turns toward the right.

Within the housing 34, the pinion gear 18 has a shaft 38 (FIG. 3) rotatably supported in bearings 40 with a suitable splined shaft 42 extending outside the housing for connecting with the stub shaft 16. The pinion gear 18 meshes with a saddle gear rack 44 which is slidably mounted on the tubular sleeve 36, with the opposite side of the sleeve 36 being backed up by a saddle support 46.

The interior of the housing 34 has a large diameter left portion 48 and a smaller diameter right portion 50, between which is an annular partition or wall 52 extending inwardly. The partition 52 is in slidable but sealing engagement with the tubular sleeve 36 with the aid of an annular seal 54. A first annular piston 56 with a seal 58 is affixed to the tubular sleeve 36 on the right side of the partition 52 with an annular cylinder 60 being formed therebetween and between the sleeve 36 and the small diameter portion 50 of the housing 34. A second annular piston 62 with a seal 64 is affixed to the tubular sleeve 36 on the left side of the partition 52 with an annular cylinder 66 formed therebetween and between the sleeve 36 and the large diameter portion 48 of the housing 34. The area of the piston 62 is greater than that of the piston 56 and can be twice as large, by way of example. In that instance, when the pressure in the annular cylinder 66 is more than half that in the annular cylinder 60, the piston 62 will be urged toward the left to move the tubular sleeve 36 toward the left relative to the housing 34. Conversely, when the pressure in the annular cylinder 66 is less than half that in the annular cylinder 60, the piston 56 will be urged toward the right to move the tubular sleeve 36 toward the right relative to the housing 34.

Fluid under pressure for the cylinders 60 and 66 is supplied from within the tubular sleeve 36. The sleeve 36 has a dividing wall 68 extending across an intermediate portion thereof and forming a reservoir 70 at a left end portion and an accumulator 72 at a right end portion of the sleeve. The accumulator 72 is formed by a flexible tube 74 which extends from the dividing wall 68 to the right end of the sleeve. The accumulator 72 is formed within the tube 74 and an annular gas chamber 76 is formed outside the tube 74, between the tube and the inner surface of the sleeve 36. The chamber 76 can be charged with gas under pressure, nitrogen being suitable, through a removable plug 78 (FIG. 5) in the sleeve 36. If desired, the accumulator can be formed in the annular chamber 76 and the gas can be employed within the tube 74. In either case, the flexible tube 74 can expand and contract to vary the volume of the accumulator 72 and the pressurized gas keeps the pressure of the fluid in the accumulator constant. The volume of the accumulator changes because the volume of the pressurized fluid in the cylinders 60 and 66 varies, depending upon the position of the sleeve 36 in the housing 34 and the positions of the piston 56 and 62 relative to the partition 52.

To supply fluid under pressure for the accumulator 72, a pump 80 is located at the right end of the tubular sleeve 36 and a pump 82 is located at the left end. However, two pumps may not be necessary for all applications. Referring to the pump 80 of FIG. 5, the tie rod 22 has a tapered portion 84 terminating in a large hemispherical ball 86 and a smaller hemispherical ball 88, with a shoulder 90 formed therebetween. The tapered portion 84 extends through a tapered opening 92 in a threaded cap 94 having an inner hemispherical recess 96 for the hemispherical ball 86 of the tie rod 22. The cap 94 is threaded on a pump body 98 which, in turn, is threaded into the tubular sleeve 36. The pump body 98 has a central cylindrical chamber 100, in the center of which is located a socket 102 having a hemispherical recess 104 which receives the hemispherical ball 88 of the tie rod 22. The edges of the socket 102 terminate short of the shoulder 90 of the tie rod to enable the tie rod to pivot.

An annular pump piston 106 is located around the socket 102 with a sealing ring 108 sealing the piston with the chamber 100 and a sealing ring 110 sealing the piston with the socket 102. An annular pump cylinder 112 is formed between the socket 102 and the inner wall of the chamber 100 as well as between the bottom of the chamber 100 and the annular pump piston 106. A return spring 113 for the piston can be located in the cylinder 106. A passage 114 connects the pump cylinder 112 with the accumulator 72, a check valve 116 being located in the passage 114. A central bore 118 in the pump body 98 connects the cylinder 112 through grooves 120 in the socket 102 with a central tube 122, there being a check valve 124 which opens and closes a passage 126 in the end of the tube 122. The tube 122 extends centrally through the accumulator 72 and through the dividing wall 68 where it communicates with the reservoir 70. The tube 122 also serves as a core around which the flexible tube 74 can collapse as the volume of pressurized fluid therein diminishes.

In the operation of the pump 80, the tie rod 122 pivots up and down with movement of the vehicle, at which time the hemispherical ball 86 pivots in the recess 96 and the hemispherical ball 88 pivots in the recess 104. The shoulder 90 then engages the outer annular surface of the annular piston 106, causing it to move inwardly in the annular cylinder 112. At this time, fluid under pressure in the cylinder 112 is forced into the accumulator 72 through the passage 114, forcing open the check valve 116. When the piston 106 moves outwardly in the cylinder 112, fluid flows from the tube 122 through the passage 126, forcing open the check valve 124. This fluid then moves through the bore and the grooves 120 into the annular cylinder 112 where it is again forced into the accumulator 72 on the next inward movement of the piston 106.

Figure 6:
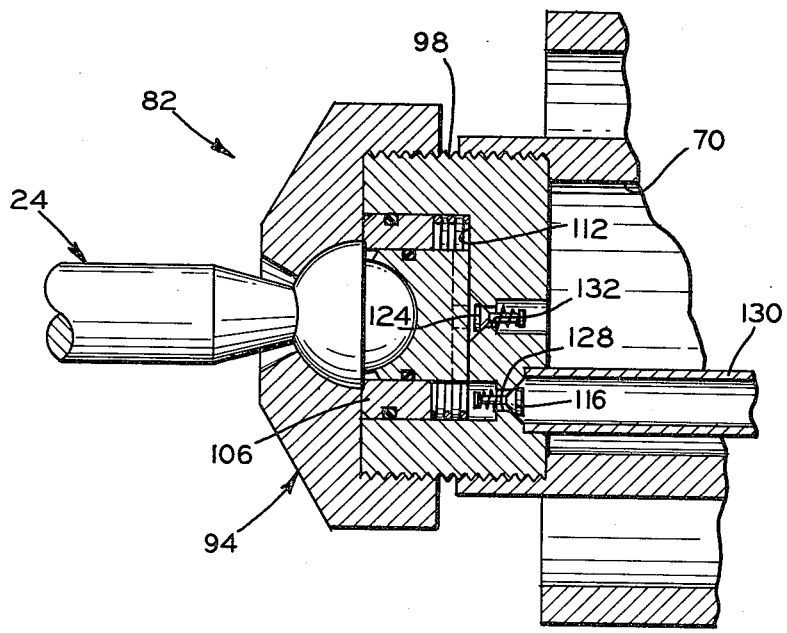
FIG. 6 is a view similar to FIG. 5 but taken through a left end portion of the power steering unit.

The fluid pump 82 (FIG. 6) at the left end of the tubular sleeve 36 is essentially the same as the pump 80. However, the pump body 98 has a slightly modified passage 128 communicating with a tube 130 and also has a slightly modified passage 132 communicating directly with the reservoir 70. The tube 130 extends through the reservoir 70 and through the dividing wall 68 where it communicates with the accumulator 72. It will be understood that other designs of pumps can be used in place of those specifically illustrated.

The smaller annular cylinder 60 is always supplied with fluid under high pressure, which remains constant, the cylinder 60 always being connected to the accumulator 72. To achieve this, the piston 56 can have a bore 134 (FIG. 5) therethrough which connects to a small tube 136. The tube 136 communicates with a suitable passage 138 in the cap 94 and a passage 140 in the pump body 98 which terminates at the accumulator 72. If the accumulator is formed around the flexible tube 74, then a hole can be formed directly through the tubular sleeve 36. In that instance, however, the gas chamber is somewhat more difficult to charge, although this can be accomplished through the pump cap and body.

Figure 7:
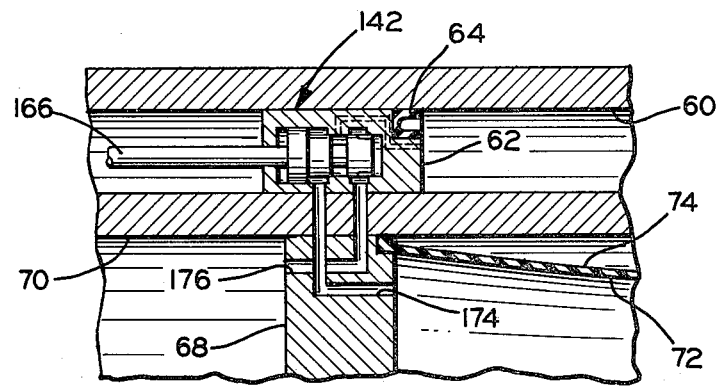
FIG. 7 is a somewhat schematic view in cross section of a valve employed in the power steering unit.

The larger annular cylinder 66 is supplied with either high pressure fluid from the accumulator 72 or low pressure fluid from the reservoir 70. This is controlled by a spool valve 142 (FIGS. 7 and 8) which can be built into the annular piston 62 or located near it and movable therewith. The spool valve 142 includes a chamber 144 having a large diameter, left end portion 146, an intermediate ridge 148, an adjacent groove 150, and a smaller diameter right end portion 152. A valve spool 154 is located in the chamber 144 and has a large diameter left end portion 156, a smaller diameter intermediate portion 158 movable across the intermediate ridge 148 of the chamber, and an annular groove 160 adjacent a right end portion 162 which is of the same diameter as the portion 158. The right end valve portion 162 is movable across the annular groove 150 and into the smaller diameter right end portion 152 of the chamber 144. The portion 162 has longitudinally-extending notches 164 communicating with the right end thereof.

The valve spool 154 is connected to and moves with the gear rack 44 by a suitable connecting rod 166 (see also FIG. 1). The valve spool 154 forms a pressure face or piston 168 at the left end and an annular pressure face or piston 170 between the portions 156 and 158. The area of the piston 170 is less than and preferably one-half the area of the piston 168, being the same ratio as the ratio of the areas of the pistons 56 and 62.

An outlet passage 172 communicates with the intermediate ridge 148 of the valve chamber 144 and the annular cylinder 66 to supply either high pressure fluid or lower control pressure fluid thereto. An inlet passage 174 connects the right end of the large diameter chamber portion 146 with the accumulator 72. Finally, an inlet passage 176 connects the annular groove 150 of the chamber 144 with the reservoir 70.

Figure 8:
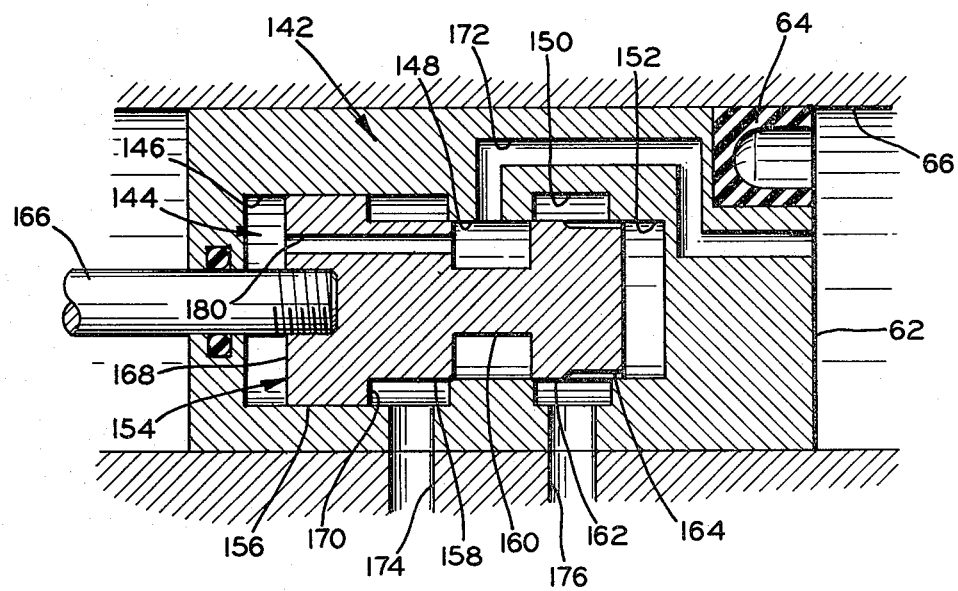
FIG. 8 is a somewhat schematic, further enlarged view in cross section of the valve of FIG. 7.

The valve spool 154 is shown in the at rest position in FIG. 8, with the vehicle moving in a straight line. At this time, the pressure in the annular cylinder 66 will be one-half of that in the annular cylinder 60. If the vehicle is now steered to the right, the pinion gear 18 will move in a clockwise direction and thereby move the gear rack 44 and the spool 154 toward the left. The accumulator passage 174 will then communicate with the outlet passage 172 to supply fluid under higher pressure from the accumulator 72 to the annular cylinder 66. As this pressure exceeds one-half the pressure in the annular cylinder 60, the force on the piston 62 will exceed that on the piston 56 and the tubular sleeve 36 will move toward the left relative to the housing, causing the wheels to turn to the right.

In order to provide the driver with some "feel" as he turns the steering wheel, it is preferable that some force will resist the movement of the valve spool 154 in the valve chamber 144. With the valve spool 154 moving toward the left, high pressure fluid acts on the annular piston 170 but the fluid under high pressure also moves through a bleed port or passage 180 which communicates with the groove 160 and with the left end of the large diameter chamber portion 146. As the fluid pressure builds up, it resists the leftward movement of the valve spool 154 and provides the desired resistance to the movement of the rack 44 so that the driver can feel resistance in the steering wheel.

When the vehicle is steered toward the left, the pinion gear 18 moves in a counterclockwise direction and moves the gear rack 44 toward the right. The valve spool 154 then moves toward the right, shutting off the passages 174 and enabling the passage 176 to communicate with the passage 172 to supply lower pressure fluid from the reservoir 70 to the annular cylinder 66. As the pressure in the cylinder 60 exceeds twice that in the cylinder 66, the force on the piston 56 exceeds that on the piston 62 and the tubular sleeve 36 moves toward the right relative to the housing 34. The wheels 30 and 32 are thus moved toward the left.

To provide resistance to the valve spool 154 in its movement toward the right, the high pressure fluid from the accumulator 66 acts on the annular piston face 170, as before. However, at this time the lower pressure from the reservoir 70 now acts on the piston face 168 since the bleed passage 180 now communicates with the reservoir, through the annular groove 160 and the passage 176. Hence, resistance to the rightward movement of the valve spool 154 is achieved.

The spool valve 142 may be equipped with suitable seals to prevent loss of pressure when the vehicle is parked for a period of time. However, some leakage during the operation is not detrimental.

Various modifications of the above-described embodiment of the invention will be apparent to those skilled in the art, and it is to be understood that such modifications can be made without departing from the scope of the invention, if they are within the spirit and the tenor of the accompanying claims.

I claim:

1. A self-energized power steering unit comprising an elongate housing, an elongate member held in said housing for longitudinal movement therein, means in said member forming a first high pressure fluid chamber, and forming a second lower pressure fluid chamber, a pump mounted on said member, a tie rod cooperating with one of said steerable wheels and connected to said pump for operating the same, said elongate member cooperating with said elongate housing to substantially form within said elongate housing a first cylinder and a second cylinder, a first piston for said first cylinder, a second piston for said second cylinder, said first and second pistons being fixedly connected to said elongate member for movement therewith, inlet means connecting said pump and said second chamber, outlet means connecting said pump and said first chamber, first passage means connecting said first chamber and said first cylinder, and valve means and passage means connecting said chambers and said second cylinder for selective supplying fluid from said chambers to said second cylinder.

2. A power steering unit according to claim 1 characterized by said first chamber being an accumulator.

3. A power steering unit according to claim 1 characterized by said second chamber being a reservoir.

4. A power steering unit according to claim 2 characterized by said second chamber being a reservoir.

5. A power steering unit according to claim 1 characterized by said first cylinder being an annular cylinder formed between said elongate housing and said member.

6. A power steering unit according to claim 1 characterized by said second cylinder being an annular cylinder formed between said elongate housing and said member.

7. A power steering unit according to claim 5 characterized by said second cylinder being a annular cylinder formed between said elongate housing and said member.

8. A power steering unit according to claim 1 characterized by mechanical steering means being carried by said steering unit and effective to control said valve means to control the fluid to said second cylinder.

9. A power steering unit according to claim 8 characterized by said mechanical steering means comprising a gear rack slidably mounted on said elongate member and a pinion gear meshing with said gear rack and rotatably carried by said housing.

10. A power steering unit according to claim 1 characterized by said valve means being a spool valve having a valve spool with opposing large and small pressure faces urging the valve spool in opposite directions and with the ratio of the area of the large pressure face to the area of the small pressure face being substantially equal to the ratio of the area of said second piston to the area of said first piston.

11. A power steering unit according to claim 1 characterized by said valve means being a spool valve with a valve spool having opposing faces subjected to different pressures, with the areas of the faces being such that the force on the valve spool due to the pressure differential opposes the direction of movement of the valve spool.

12. A power steering unit according to claim 1 characterized by said pump being mounted on an end of said member, a second pump mounted on the other end of said member, a second tie rod connected to said second pump for operating same, said second outlet means communicating said second pump with said first chamber.

13. A self-energized power steering unit comprising an elongate housing, a tubular sleeve held in said housing for longitudinal movement therein, means in said sleeve forming a hydraulic accumulator at one portion and a fluid reservoir at another portion, pump means at at least one end of said sleeve, said housing and said sleeve forming a first annular cylinder around said sleeve and having a first annular piston at one end fixed to said sleeve for movement therewith, said housing and said sleeve forming a second annular cylinder around said sleeve and having a second annular piston at one end fixed to said sleeve for movement therewith, inlet means connecting said pump means and said reservoir, outlet means connecting said pump means and said accumulator, first passage means connecting said accumulator and said first annular cylinder, valve means disposed within said elongate housing, steering means connected to said valve means to operate the same, second passage means connecting said valve means and said second annular cylinder, third passage means connecting said accumulator and said valve means, and fourth passage means connecting said valve means and said reservoir, said valve means being operable to communicate one of said annular cylinders with said accumulator and to also communicate the other of said annular cylinders with said reservoir.

14. A power steering unit according to claim 13 characterized by means connected to said pump means for operating said pump means when an automotive vehicle with which the unit is used is in motion.

15. A power steering unit according to claim 14 characterized by said last-named means being a tie rod.

16. A power steering unit according to claim 14 characterized by second pump means at the other end of said sleeve, means connected to said second pump means for operating said second pump means when the automobile vehicle with which the unit is used is in motion, and second outlet means communicating said second pump with said accumulator.

17. A power steering unit according to claim 16 characterized by said last-named means being a tie rod.

18. A power steering unit according to claim 13 characterized by said first annular piston having an area one-half that of said second annular piston.

19. A power steering unit according to claim 13 characterized by said steering means comprising a rack and pinion with said rack being connected to said valve means.

20. Apparatus according to claim 19 characterized by said valve means comprising a spool valve with said rack being connected to a valve spool of said spool valve.

21. A power steering unit according to claim 13 characterized by said hydraulic accumulator being formed by a flexible tube in said one portion of said sleeve.

22. A power steering unit according to claim 21 characterized by a source of gas under pressure being on the side of said flexible tube opposite said accumulator.

23. A self-contained power steering unit comprising an elongate housing, a tubular sleeve held in said housing for longitudinal movement therein, means in said sleeve forming a hydraulic accumulator at one end portion and a fluid reservoir at another end portion, pump means carried at one end of said sleeve, outlet means in said sleeve connecting said pump means with said accumulator, inlet means in said sleeve connecting said pump means with said reservoir, said housing having a partition extending inwardly in slidable but sealing contact with the outer surface of said sleeve, a first annular piston affixed to said sleeve on one side of said partition and forming a first annular cylinder therebetween and between said housing and said sleeve, a second annular piston affixed to said sleeve on the side of said partition opposite said first piston and forming a second annular cylinder therebetween and between said housing and said sleeve, passage means connecting said accumulator and said first annular cylinder, valve means carried by said sleeve, a gear rack slidable on said sleeve for controlling said valve means, second passage means connecting said valve means and said second annular cylinder, third passage means connecting said accumulator and said valve means, and fourth passage means connecting said reservoir and said valve means, said valve means being movable relative to said sleeve to communicate one of said annular cylinders with said accumulator and to communicate the other of said annular cylinders with said reservoir.

24. A power steering unit according to claim 23 characterized by said first piston having an area one-half of the area of said second piston.

25. A power steering unit according to claim 23 characterized by said valve means comprising a spool valve with said gear rack being connected to a valve spool of said spool valve.

26. A power steering unit according to claim 23 characterized by said hydraulic accumulator being formed by a flexible tube in said one end portion of said sleeve.

27. A power steering unit according to claim 26 characterized by a source of gas under pressure being on the side of said flexible tube opposite said accumulator.

28. A power steering unit according to claim 23 characterized by means connected to said pump means for operating said pump means when an automotive vehicle with which the unit is used is in motion.

29. A power steering unit according to claim 28 characterized by said last named-means being a tie rod.

30. A power steering unit according to claim 23 characterized by said means forming said accumulator and said reservoir comprising a dividing wall in said sleeve, and said third passage means and said fourth passage means being formed, at least in part, in said dividing wall.

31. In a rack and pinion power steering unit, a tubular housing movably supporting the rack, the pinion extending into the tubular housing to engage the rack, the rack including a tubular member movably disposed within the tubular housing and extending substantially the length of the housing, the tubular member cooperating with the tubular housing to form a pair of pressure chambers between the housing and member and at least one tie rod connecting the tubular member with a wheel assembly, characterized by said tie rod and said tubular member cooperating with means disposed therebetween to define a pump which is adapted to generate fluid pressure in response to movement of said wheel assembly and said tie rod in relation to said tubular member, and said tubular member including passages for communicating the fluid pressure to said pair of pressure chambers to provide a power assist during steering.

32. The rack and pinion power steering unit of claim 31 characterized by said tubular member substantially being hollow with an intermediate wall separating a fluid reservoir from a fluid pressure storage chamber, said fluid reservoir and said fluid pressure storage chamber both being completely enclosed within said tubular member.

33. The rack and pinion power steering unit of claim 31 characterized by said tie rod defining a universal joint with said tubular member to permit pivotal movement of said tie rod relative to said tubular member and said pivotal movement actuating said pump.

34. In a self-energized fluid pressure unit for a vehicle having at least one steerable wheel assembly, a tubular housing fixedly disposed relative to the vehicle, a rack assembly movably disposed within the tubular housing and connecting with the one wheel assembly via a tie rod to control the steering direction of the one wheel assembly relative to the vehicle, and the tie rod being pivotally connected to the rack assembly to permit pivotal movement of the tie rod relative to the rack assembly when the wheel assembly is moving relative to the vehicle, characterized by said tie rod and said rack assembly cooperating with means disposed therebetween to substantially define a pump which is adapted to generate fluid pressure solely in response to the pivotal movement of said tie rod relative to said rack assembly.

35. The self-energized fluid pressure limit of claim 34 further characterized by said rack assembly defining at least two interior chambers communicating with said pump, one of said chambers comprising a reservoir for storing fluid and the other of said chambers comprising an accumulator for storing fluid pressure therein developed by said pump.

* * * * *